US009130994B1

(12) United States Patent
Newstadt (10) Patent No.: US 9,130,994 B1
(45) Date of Patent: Sep. 8, 2015

(54) TECHNIQUES FOR AVOIDING DYNAMIC DOMAIN NAME SYSTEM (DNS) COLLISIONS

(75) Inventor: Keith Newstadt, Newton, MA (US)

(73) Assignee: Symantec Corporation, Mountain View, CA (US)

( * ) Notice: Subject to any disclaimer, the term of this patent is extended or adjusted under 35 U.S.C. 154(b) by 446 days.

(21) Appl. No.: 13/043,878

(22) Filed: Mar. 9, 2011

(51) Int. Cl.
*G06F 15/16* (2006.01)
*H04L 29/08* (2006.01)
*H04L 29/12* (2006.01)

(52) U.S. Cl.
CPC .............. *H04L 67/18* (2013.01); *H04L 61/103* (2013.01)

(58) Field of Classification Search
USPC ......................................................... 709/202
See application file for complete search history.

(56) References Cited

U.S. PATENT DOCUMENTS

| | | | | |
|---|---|---|---|---|
| 7,289,729 | B1* | 10/2007 | Eslambolchi et al. | 398/28 |
| 2004/0235476 | A1* | 11/2004 | Martlew | 455/436 |
| 2004/0259626 | A1* | 12/2004 | Akram et al. | 463/17 |
| 2006/0023637 | A1* | 2/2006 | Griffin et al. | 370/252 |
| 2008/0022392 | A1* | 1/2008 | Karpati et al. | 726/15 |
| 2009/0006635 | A1* | 1/2009 | Siegmund | 709/228 |
| 2010/0115092 | A1* | 5/2010 | Westin | 709/224 |
| 2010/0135301 | A1* | 6/2010 | Bosch et al. | 370/392 |
| 2011/0013569 | A1* | 1/2011 | Scherzer et al. | 370/329 |
| 2011/0270685 | A1* | 11/2011 | Marks et al. | 705/14.66 |

OTHER PUBLICATIONS

OpenDNS Web Page, Retrieved on May 31, 2011 at: http://www.opendns.com/solutions/business?_kk=open%20DNS&_kt=83f7cf59-8f1c-4ee0-9331-0e495c3b6e62&gclid=CMSurOjkkqkCFRphgwodrS9Nng.
DynSNS Web Page, Retrieved on May 31, 2011 at: http://www.dyndns-ng.com/home.php.
MyDNS Web Page, Retrieved on May 31, 2011 at: http://www.mydns-ng.com/home.php.
EveryDNS Web Page, Retrieved on May 31, 2011 at: http://www.everydns.com.
D-Link Web Page, Retrieved on May 31, 2011 at http://www.dlink.com/serviceprovider/.
Linksys Web Page, Retrieved on May 31, 2011 at http://linksysbycisco.com.

* cited by examiner

*Primary Examiner* — Richard G Keehn
(74) *Attorney, Agent, or Firm* — Wilmer Cutler Pickering Hale and Dorr LLP (57) ABSTRACT

Techniques for avoiding dynamic domain name system (DNS) collisions are disclosed. In one particular exemplary embodiment, the techniques may be realized as a method for avoiding dynamic domain name system (DNS) collisions comprising: storing a first location associated with a first client device, a second location associated with a second client device, and a third location associated with a network, receiving, from the first client device, a first notification indicating an Internet Protocol (IP) address via the network, receiving, from the second client device, a second notification indicating the IP address via the network, determining a most likely owner of the network between the first client device and the second client device based on the first location, the second location, and the third location, and applying a content filtering policy associated with the first client device when the first client device is determined to be the most likely owner.

20 Claims, 6 Drawing Sheets

TECHNIQUES FOR AVOIDING DYNAMIC DOMAIN NAME SYSTEM (DNS) COLLISIONS

FIELD OF THE DISCLOSURE

The present disclosure relates generally to domain name systems and, more particularly, to techniques for avoiding dynamic domain name system (DNS) collisions.

BACKGROUND OF THE DISCLOSURE

In recent years, Internet users have increasingly utilized the resources of Internet Service Providers (ISPs) to establish private networks (e.g., home networks, small business networks). In some instances, these Internet users may utilize the domain resolution services and content filtering services offered by the ISPs. In other instances, these Internet users may utilize the domain name resolution services and content filtering services offered by other third party providers. Accordingly, as the amount of Internet users associated with private networks increases, the amount of Internet users that utilize the domain name resolution services and content filtering services provided by the same ISP or third party provider also increases. As a result, an increased amount of domain name system (DNS) (e.g., dynamic DNS) collisions may occur.

In view of the foregoing, it may be understood that there may be significant problems and shortcomings associated with current dynamic DNS technologies.

SUMMARY OF THE DISCLOSURE

Techniques for avoiding dynamic domain name system (DNS) collisions are disclosed. In one particular exemplary embodiment, the techniques may be realized as a method for avoiding dynamic domain name system (DNS) collisions comprising: storing a first location associated with a first client device, a second location associated with a second client device, and a third location associated with a network, receiving, from the first client device, a first notification indicating an Internet Protocol (IP) address via the network, receiving, from the second client device, a second notification indicating the IP address via the network, determining a most likely owner of the network between the first client device and the second client device based on the first location, the second location, and the third location, and applying a content filtering policy associated with the first client device when the first client device is determined to be the most likely owner.

In accordance with other aspects of this particular exemplary embodiment, the first location may be associated with the primary location of the first client device.

In accordance with further aspects of this particular exemplary embodiment, the network may be a private network.

In accordance with additional aspects of this particular exemplary embodiment, the method may further include determining at least one of the first location, the second location, and the third location using one or more trace routes.

In accordance with other aspects of this particular exemplary embodiment, the method may further include determining at least one of the first location, the second location, and the third location using triangulation.

In accordance with further aspects of this particular exemplary embodiment, the first location, the second location, and the third location may be logical locations.

In accordance with additional aspects of this particular exemplary embodiment, the first location, the second location, and the third location may be physical locations.

In accordance with other aspects of this particular exemplary embodiment, the first client device may store a first dynamic DNS agent.

In accordance with further aspects of this particular exemplary embodiment, the second client device may store a second dynamic DNS agent.

In accordance with additional aspects of this particular exemplary embodiment, the second client device may be visiting an area associated with the third location.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process.

In another particular exemplary embodiment, the techniques may be realized as an article of manufacture for avoiding dynamic domain name system (DNS) collisions, the article of manufacture comprising: at least one non-transitory processor readable medium, and instructions stored on the at least one medium, wherein the instructions are configured to be readable from the at least one medium by at least one processor and thereby cause the at least one processor to operate so as to: store a first location associated with a first client device, a second location associated with a second client device, and a third location associated with a network, receive, from the first client device, a first notification indicating an Internet Protocol (IP) address via the network, receive, from the second client device, a second notification indicating the IP address via the network, determine a most likely owner of the network between the first client device and the second client device based on the first location, the second location, and the third location, and apply a content filtering policy associated with the first client device when the first client device is determined to be the most likely owner.

In another particular exemplary embodiment, the techniques may be realized as a system for avoiding dynamic domain name system (DNS) collisions comprising: one or more processors communicatively coupled to a network, wherein the one or more processors are configured to: store a first location associated with a first client device, a second location associated with a second client device, and a third location associated with a network, receive, from the first client device, a first notification indicating an Internet Protocol (IP) address via the network, receive, from the second client device, a second notification indicating the IP address via the network, determine a most likely owner of the network between the first client device and the second client device based on the first location, the second location, and the third location, and apply a content filtering policy associated with the first client device when the first client device is determined to be the most likely owner.

In accordance with other aspects of this particular exemplary embodiment, the first location may be associated with the primary location of the first client device.

In accordance with further aspects of this particular exemplary embodiment, the network may be a private network.

In accordance with additional aspects of this particular exemplary embodiment, one or more processors may be configured to determine at least one of the first location, the second location, and the third location using one or more trace routes.

In accordance with other aspects of this particular exemplary embodiment, one or more processors may be configured to determine at least one of the first location, the second location, and the third location using triangulation.

In accordance with further aspects of this particular exemplary embodiment, the first location, the second location, and the third location may be logical locations.

In accordance with additional aspects of this particular exemplary embodiment, the first location, the second location, and the third location may be physical locations.

In accordance with other aspects of this particular exemplary embodiment, the second client device may be visiting an area associated with the third location.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

An Internet user may establish a private network (e.g., a home network) at a primary location (e.g., a home) using one or more services provided by an Internet Service Provider (ISP). In addition, the Internet user may initiate the receipt of domain name resolution services, content filtering services, or a combination of both, from the ISP or a third party provider. As a result, a Domain Name System (DNS) agent (e.g., a dynamic DNS agent) may be installed on a primary client device located at the primary location to provide a backend server (e.g., a server associated with providing domain resolution services, a server associated with providing content filtering services) with the latest Internet Protocol (IP) address assigned to the primary client device (or private network).

In addition, the Internet user may establish a content filtering policy for the primary location. For example, a content filtering policy may allow all content to be accessed via the private network. In another example, a content filtering policy may restrict access to malicious content (e.g., websites containing malware) via the private network. In another example, a content filtering policy may restrict access to pornographic content (e.g., websites with pornographic content) via the private network. In yet another example, a content filtering policy may restrict access to all content via the private network. To ensure that the proper content filtering policy is enforced, the backend server may maintain an association between the content filtering policy and the latest IP address assigned to the primary client device (or private network).

In certain instances, however, a visiting client device (e.g., a client device that temporarily visits the primary location) with the same dynamic DNS agent may provide the same current IP address provided by the primary client device. As a result, the backend server may not know whether to attribute the current IP address provided to the primary client device or the visiting client device. If, for example, the backend server attributes the current IP address to the visiting client device, any content filtering policy associated with the visiting client device may be applied to the private network.

In one embodiment, certain techniques for avoiding such dynamic DNS collisions are provided. In such an embodiment, during a dynamic DNS account activation stage (e.g., a registration stage), the backend server may receive the current IP address associated with (e.g., assigned to) the primary client device of the Internet user. The backend server may then locate the IP address on the Internet using trace routes, triangulation, an IP address geolocation, or any other mechanism for identifying a location associated with an IP address. Once a location is determined, the backend server may verify that the location and the IP address are not associated with any other dynamic DNS account associated with (e.g., stored by) the backend server. If verified, the backend server may store the location in the Internet user's dynamic DNS account as the primary location. Accordingly, the primary location associated with a dynamic DNS account may be static, while the IP address associated with the dynamic DNS account may be dynamic.

As a result of applying such techniques, the dynamic DNS collision described above may be avoided as follows. When a visiting client device with the same dynamic DNS agent provides the same current IP address provided by the primary client device, the backend server may attribute the current IP address to the client device that is most likely to own the private network (e.g., the client device that most likely belongs to the primary location). Accordingly, once the same current IP address is received from the visiting client device and the primary client device, the backend server may access the primary location associated with the dynamic DNS account of the user of the visiting client device and the primary location associated with the dynamic DNS account of the user of the primary client device. The backend server may then determine whether the visiting client device or the primary client device is the most likely owner of the private network by comparing the primary locations accessed.

In one embodiment, the backend server may determine whether the visiting client device or the primary client device is the most likely owner of the private network by comparing primary locations accessed to the primary location of the private network. In such an embodiment, a client device associated with a primary location that is within a reasonable distance from the primary location (e.g., within the same area code, within 500 yards, within the same zip code) of the private network may be considered the most likely owner of the private network. As a result, the backend server may attribute the current IP address to the client device that is considered to be the most likely owner of the private network.

In another embodiment, the backend server may determine whether the visiting client device or the primary client device is the most likely owner of the private network by comparing a distance between the primary location of the visiting client device and the location associated with the current IP address to a distance between the primary location of the primary client device and the location associated with the current IP address. If, for example, the distance between the primary location of the primary client device and the location associated with the current IP address is shorter than the distance between the primary location of the visiting client device and the location associated with the current IP address, the backend server may consider the primary client device to be the most likely owner of the private network and attribute the current IP address to the primary client device. As a result, the backend server may apply the content filtering policy associated with the primary client device. Accordingly, enforcement of the content filtering policy of the private network may not be interrupted by the presence of a visiting client device at the primary location of the private network.

Figure 1:
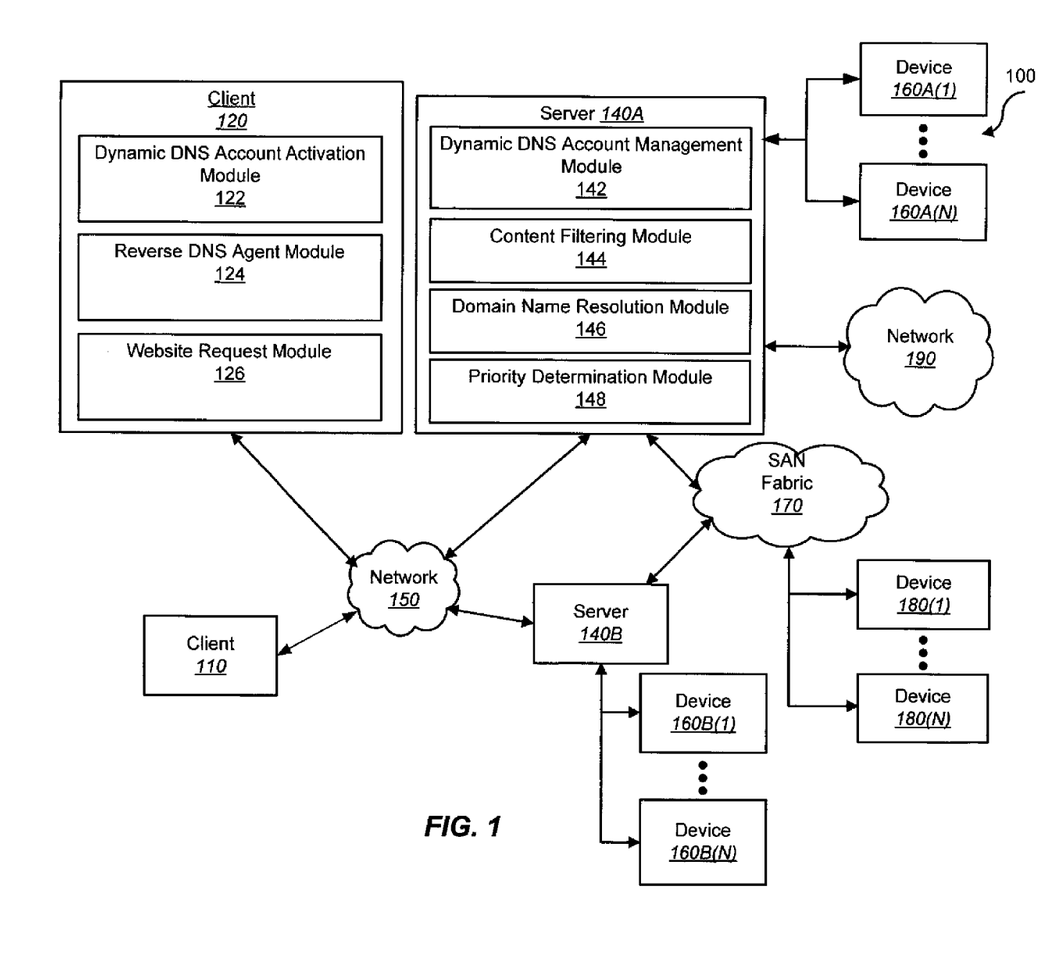
FIG. 1 shows a block diagram depicting a network architecture containing a platform for avoiding dynamic domain name system (DNS) collisions in accordance with an embodiment of the present disclosure.

FIG. 1 shows a block diagram depicting a network architecture 100 containing a platform for avoiding dynamic DNS collisions in accordance with an embodiment of the present disclosure. FIG. 1 is a simplified view of network architecture 100, which may include additional elements that are not depicted. Network architecture 100 may contain client 110, client 120, server 140A, as well as server 140B (one or more of which may be implemented using computer system 200 shown in FIG. 2). Client 110, client 120, server 140A, and server 140B may be communicatively coupled to a network 150. Server 140A may be communicatively coupled to storage devices 160A(1)-(N), and server 140B may be communicatively coupled to storage devices 160B(1)-(N). Server 140A may contain one or more modules for avoiding dynamic DNS collisions including a dynamic DNS account management module 142, a content filtering module 144, a domain name resolution module 146, and a priority determination module 146. Server 140A and server 140B may be communicatively coupled to a SAN (Storage Area Network) fabric 170. SAN fabric 170 may support access to storage devices 180(1)-(N) by server 140A and server 140B, and by client 110 and client 120 via network 150. Server 140A may be communicatively coupled to network 190. Client 120 may contain one or more modules for avoiding dynamic domain name system (DNS) collisions including a dynamic DNS account activation module 122, a reverse DNS agent module 124, and a website request module 126.

Figure 2:
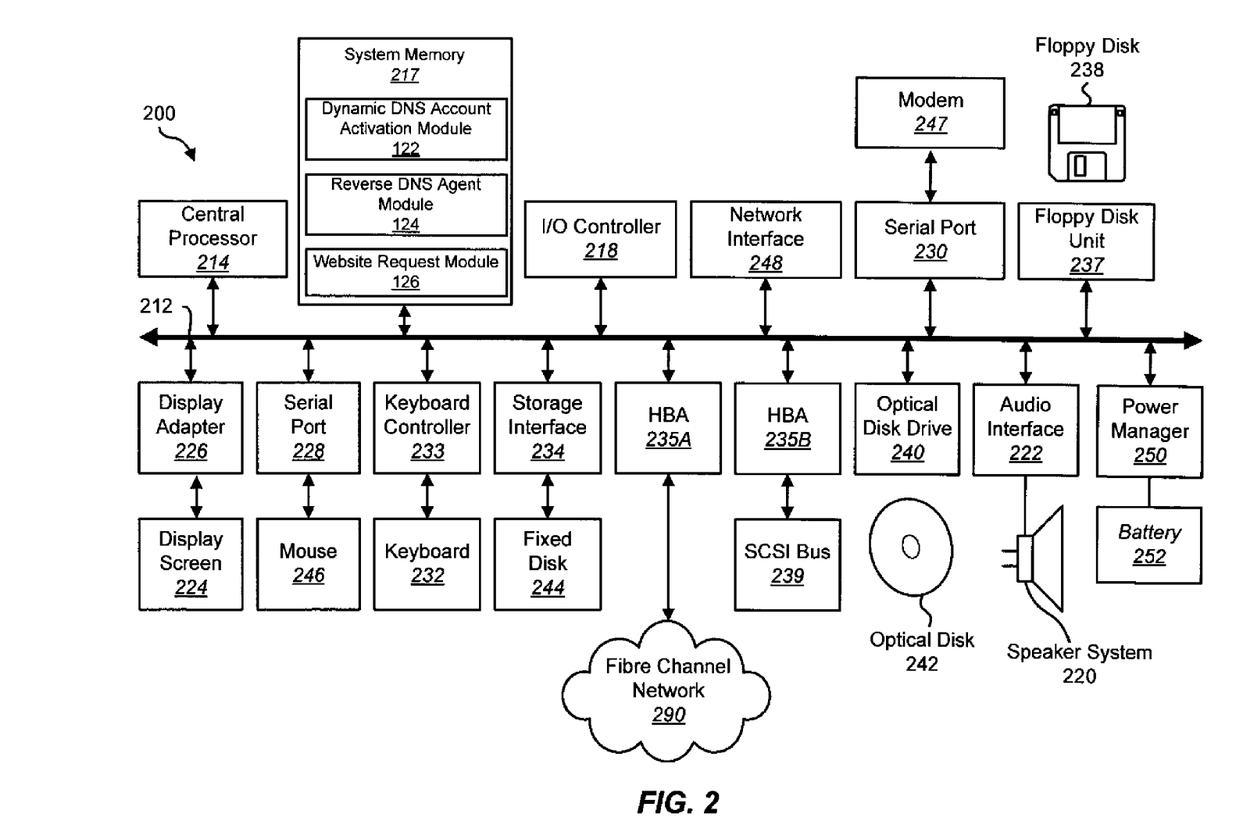
FIG. 2 depicts a block diagram of a computer system in accordance with an embodiment of the present disclosure.

With reference to computer system 200 of FIG. 2, modem 247, network interface 248, or some other method may be used to provide connectivity from one or more of client 110 and client 120 to network 150. Client 120 may be able to access information on server 140A or server 140B using, for example, a web browser or other client software. Such a client may allow client 120 to access data hosted by server 140A or server 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between client 110, client 120, server 140A, server 140B, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to client 110, client 120, server 140A, or server 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup, replication, or archival purposes.

According to some embodiments, client 110 and client 120 may be a smartphone, PDA, desktop computer, a laptop computer, a server, another computer, or another device coupled via a wireless or wired connection to network 150. Client 110 and client 120 may receive data from user input, a database, a file, a web service, and/or an application programming interface.

Server 140A and server 140B may be application servers, archival platforms, backup servers, backend servers, network storage devices, media servers, email servers, document management platforms, enterprise search servers, or other devices communicatively coupled to network 150. Server 140A and server 140B may utilize one of storage devices 160A(1)-(N), 160B(1)-(N), and/or 180(1)-(N) for the storage of application data, replication data, backup data, or other data. Server 140A and server 140B may be hosts, such as an application server, which may process data traveling between client 110 and client 120 and a backup platform, a backup process, and/or storage. According to some embodiments, server 140A and server 140B may be platforms used for backing up and/or archiving data.

Dynamic DNS account activation module 122, reverse DNS agent module 124, website request module 126, dynamic DNS account management module 142, content filtering module 144, domain name resolution module 146, and priority determination module 148 are discussed in further detail below.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, dynamic DNS account activation module 122, reverse DNS agent module 124, and website request module 126 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
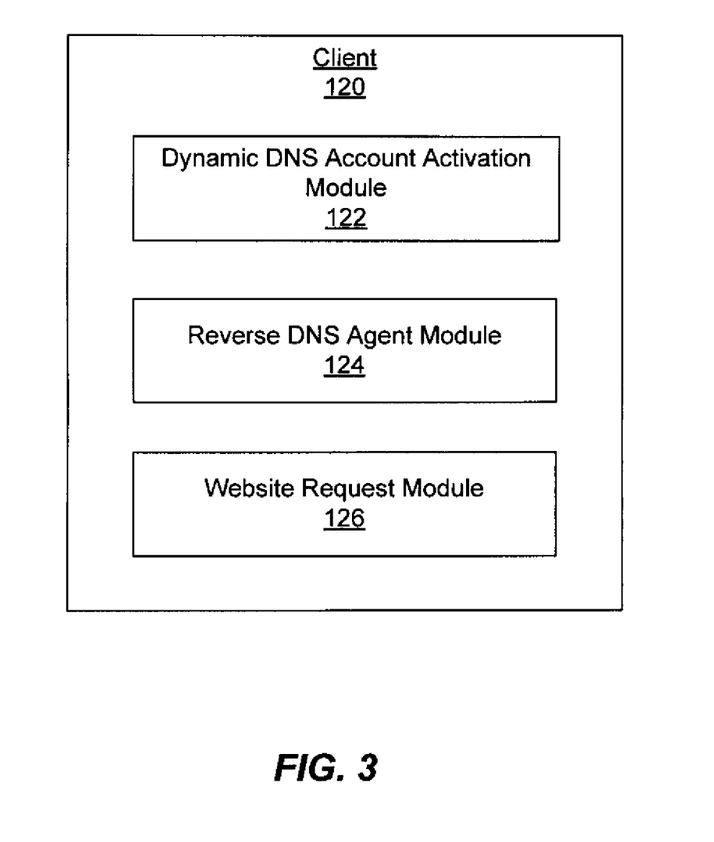
FIG. 3 shows modules of a client in accordance with an embodiment of the present disclosure.

FIG. 3 shows modules of a client 120 in accordance with an embodiment of the present disclosure. As illustrated, the client 120 may contain one or more components including a dynamic DNS account activation module 122, a reverse DNS agent module 124, and a website request module 126.

The description below describes network elements, computers, and/or components of a system and method for avoiding dynamic DNS collisions that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Dynamic DNS account activation module 122 may be configured to allow a user of client 120 to activate a dynamic DNS account during a registration stage. As a result of activating the dynamic DNS account, the user may be provided with a unique user identification number or a unique account number. Such a unique number may be used to identify the user's dynamic DNS account in one or more subsequent transactions (e.g., modifying a content filtering policy).

Dynamic DNS account activation module 122 may also be configured to allow a registered user (e.g., with a dynamic DNS account) to initiate any, or a combination, of domain name resolution services, content filtering services, and priority determination services provided by a backend server (e.g., server 140A). If, for example, a registered user initiates content filtering services, the dynamic DNS account activation module 122 may allow the registered user to input (e.g., define) a content filtering policy that is to be enforced on a private network established at a primary location (e.g., a home, an office) of a client device (e.g., client 120).

In one embodiment, a user may define a content filtering policy that allows all content to be accessed via the private network. In another embodiment, a user may define a content filtering policy that restricts access to malicious content (e.g., websites containing malware) via the private network. In another embodiment, a user may define a content filtering policy that restricts access to pornographic content (e.g., websites with pornographic content) via the private network. In yet another embodiment, a user may define a content filtering policy that restricts access to all content via the private network (e.g., during a particular time frame). Dynamic DNS account activation module 122 may allow a user to input or define the content filtering policy using a graphical user interface (GUI) that is operable on a client device (e.g., client 120).

Reverse DNS agent module 124 may be configured to transmit the current IP address assigned to a client device (or private network) at the primary location to a backend server (e.g., server 140A) during a registration stage. Thereafter, the reverse DNS agent module 124 may transmit an updated IP address assigned to a client device (or private network) to a backend server. In one embodiment, the reverse DNS agent module 124 may transmit an updated IP address to the backend server as soon as the current IP address assigned to the client device is changed to the updated IP address. In another embodiment, the reverse DNS agent module 124 may transmit an updated IP address to the backend server periodically.

Website request module 126 may be configured to allow a user of a client device (e.g., client 120) at a primary location to request one or more websites in accordance with an enforced content filtering policy. For example, in response to a request, websites that contain content that is allowed by the content filtering policy may be provided to the client device while websites that contain content that is not allowed by the content filtering policy may not be provided to the client device.

Figure 4:
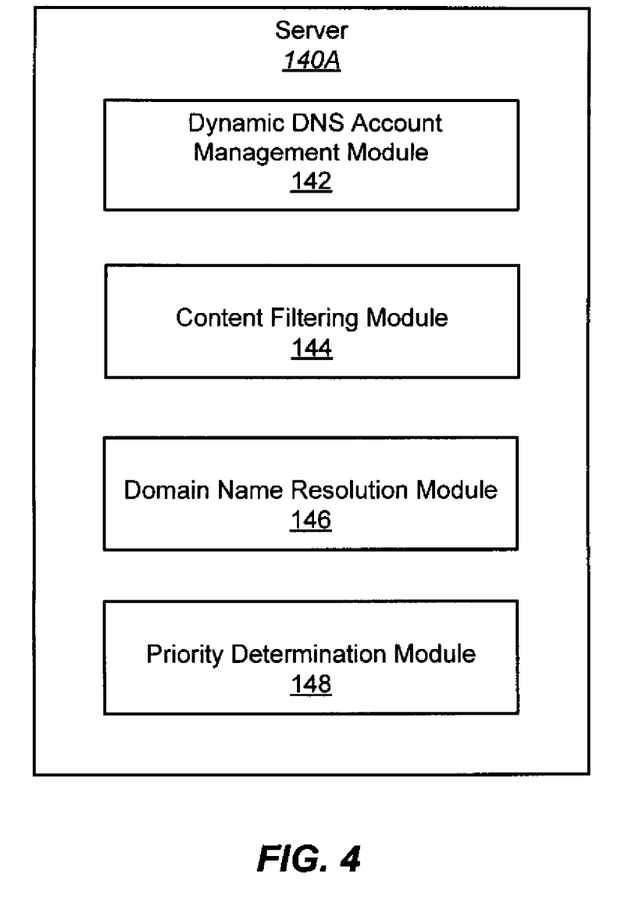
FIG. 4 shows modules of a server in accordance with an embodiment of the present disclosure.

FIG. 4 shows modules of a server 140A in accordance with an embodiment of the present disclosure. As illustrated, the server 140A may contain one or more components including a dynamic DNS account management module 142, a content filtering module 144, a domain resolution module 146, and a priority determination module 148.

The description below describes network elements, computers, and/or components of a system and method for avoiding dynamic DNS collisions that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Dynamic DNS account management module 142 may be configured to activate (e.g., store) a dynamic DNS account on behalf of a user of a client device. Accordingly, the dynamic DNS account management module 124 may generate a unique user identification number or a unique account number for each activated dynamic DNS account. As a result, the dynamic DNS account management module 124 may store a plurality of dynamic DNS accounts associated with a plurality of users. Each dynamic DNS account stored in the dynamic DNS account may be identifiable via the unique user identification number or unique account generated for a particular dynamic DNS account.

Dynamic DNS account management module 142 may be configured to activate any, or a combination, of domain name resolution services, content filtering services, and priority determination services. Any of these services may be performed for a private network established at a primary location (e.g., home, office) of a client device (e.g., client 120) or a user.

During a registration stage, the dynamic DNS account management module 142 may receive an IP address that is currently assigned to a client device (e.g., client 120) from the client device. Based on the IP address received, the dynamic DNS account management module 142 may determine and store a location of the IP address (e.g., on the Internet) using one or more trace routes, triangulation, an IP address geolocation, or any other mechanism for identifying a location associated with an IP address. Once the location is determined, the dynamic DNS account management module 142 may verify that the location and the IP address are not associated with any other dynamic DNS account stored in the server 140. The verified location may then be appended to (e.g., stored in) the dynamic DNS account associated with the sending client device (e.g. client 120) as the primary location.

Thereafter, the dynamic DNS account management module 142 may receive updated IP addresses from the client device (e.g., client 120) as the IP addresses assigned to the client device change. Accordingly, the primary location associated with a dynamic DNS account may be static, while the IP address associated with the dynamic DNS account may be dynamic.

Content filtering module 144 may be configured to receive and store a content filtering policy associated with a client device (e.g., client 120) or a private network. Content filtering module 144 may associate each content filtering policy receive with the corresponding dynamic DNS account. Accordingly, each content filtering policy may be associated with a corresponding primary location and a corresponding current IP address.

Domain name resolution module 146 may be configured to receive a request for a website from a client device (e.g., client 120). As part of the request, the domain name resolution module 146 may receive the current IP address from the requesting client and the domain name of the website requested. Based on the current IP address received, the domain name resolution module 146 may allow the content filtering module 144 to apply the appropriate content filtering policy to the request prior to returning the results of the request. If, for example, the content filtering module 144 determines that access to the requested website is allowed under the content filtering policy, the domain name resolution module 146 may return the requested website to the requesting client device. If, however, the content filtering module 144 determines that access to the requested website is not allowed under the content filtering policy, the domain name resolution module 146 may return a webpage that indicates that the requested website is not allowed under the current content filtering policy.

Priority determination module 148 may be configured to detect and resolve dynamic DNS collisions. A dynamic DNS collision may occur when a first client device (e.g., a primary client device) associated with a primary location and a private network at the primary location and a second client device (e.g., visiting client device) visiting the primary location each store the same type of dynamic DNS agent (e.g., dynamic DNS agents provided by the same third party provider). As a result of each storing the same type of dynamic DNS agent and the second client device roaming to the private network of the primary location, the first client device may provide a current IP address assigned to the private network of the primary location to server 140A and the second client device may also provide the current IP address assigned to the private network of the primary location to server 140A.

If, for example, server 140A associates the current IP address with the first client device, the proper content filtering policy defined by the user of the first client device may be enforced on the private network. If, however, server 140A associates the current IP address with the second client device, any content filtering policy associated with the second client device may be improperly enforced on the private network.

To resolve such a dynamic DNS collision, the priority determination module 148 may attribute the current IP address to the client device that most likely owns the private network (e.g., the client device that most likely belongs to the primary location, the client device that is associated with a user that most likely owns the private network). Accordingly, once the same current IP address is received from the first client device and the second client device, the priority determination module 148 may access a primary location associated with the dynamic DNS account of the user of the first client device and a primary location associated with the dynamic DNS account of the user of the second client device. The priority determination module 148 may then determine whether the first client device or the second client device is the most likely owner of the private network by comparing the primary locations accessed.

In one embodiment, the priority determination module 148 may determine whether the first client device or the second client device is the most likely owner of the private network by comparing the primary locations accessed to the primary location of the private network. In such an embodiment, a client device associated with a primary location that is within a reasonable distance from the primary location (e.g., within the same area code, within 500 yards, within the same zip code) of the private network may be considered the most likely owner of the private network. As a result, the priority determination module 148 may attribute the current IP address to the client device that is considered to be the most likely owner of the private network.

In another embodiment, the priority determination module 148 may determine whether the first client device or the second client device is the most likely owner of the private network by comparing a distance between the primary location of the first client device and the location associated with the current IP address to a distance between the primary location of the second client device and the location associated with the current IP address. If, for example, the distance between the primary location of the first client device and the location associated with the current IP address is shorter than the distance between the primary location of the second client device and the location associated with the current IP address, the priority determination module 148 may consider the first client device to be the most likely owner of the private network and attribute the current IP address to the first client device. As a result, the priority determination module 148 may apply the content filtering policy associated with the first client device. Accordingly, enforcement of the content filtering policy of the private network may not be interrupted by the presence of a second client device at the primary location of the private network.

Figure 5:
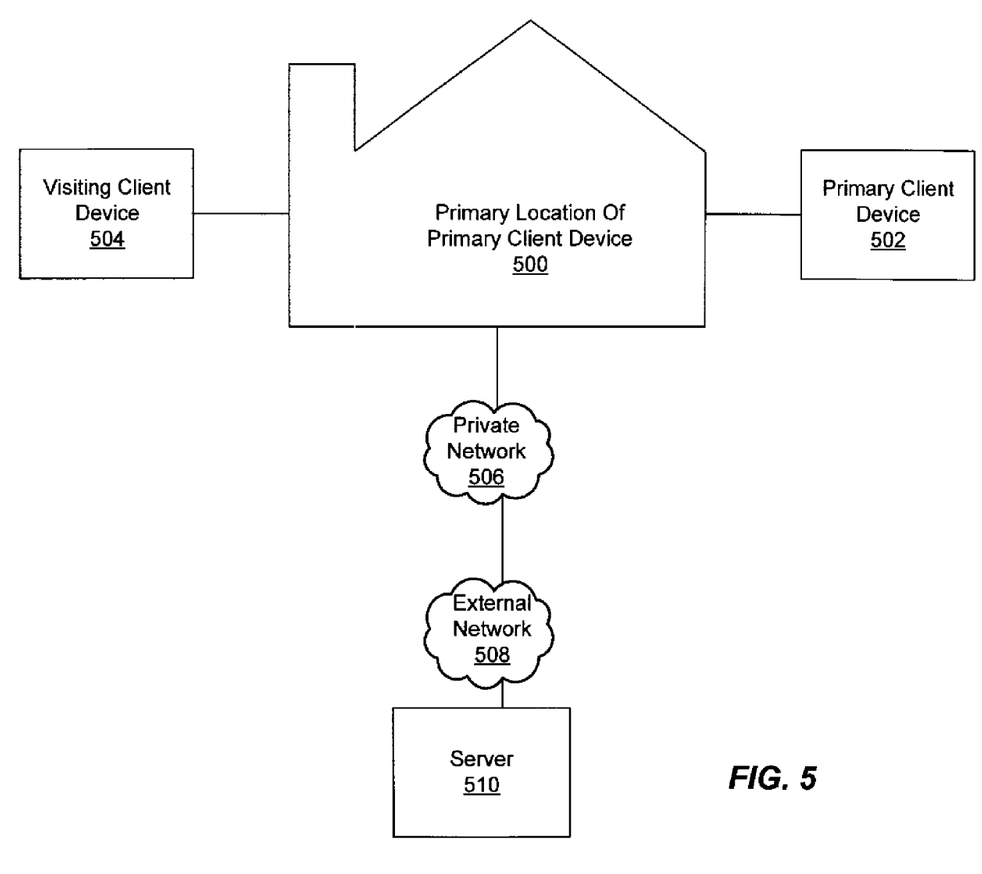
FIG. 5 shows an environment in which a dynamic DNS collision may occur in accordance with an embodiment of the present disclosure.

FIG. 5 shows an environment in which a dynamic DNS collision may occur in accordance with an embodiment of the present disclosure. As illustrated in FIG. 5, private network 506 established at a primary location of a primary client device 500 may be associated with a current IP address. Accordingly, the dynamic DNS agent stored on the primary client device 502 may provide the current IP address to server 510 (e.g., a backend server, server 140A). Based on the current IP address provided by the primary client device 502, the server 510 may enforce the appropriate content filtering policy that a user of the primary client device 502 previously defined.

If, for example, a visiting client device 504 storing the same type of dynamic DNS agent visits the primary location of the primary client device 500 and roams to the private network 506, the dynamic DNS agent stored on the visiting client device 504 may also provide the current IP address to the server 510. As a result, the server 510 may not know which, if any, content filtering policies should be enforced on the private network 506. That is, the server 510 may not know whether to attribute the current IP address to the primary client device 502 and apply the content filtering policy defined by the user of the primary client device 502 or to attribute the current IP address to the visiting client device 504 and apply the content filtering policy defined by the user of the visiting client device 504.

Using the dynamic DNS collision avoidance techniques described herein, the server 510 may attribute the current IP address to the primary client device 502 based on the primary location of the primary client device 502 stored in the corresponding dynamic DNS account. That is, the server 510 may attribute the current IP address to the primary client device 502 based on the primary client device's 502 proximity to the primary location 500 or a location associated with the current IP address.

Figure 6:
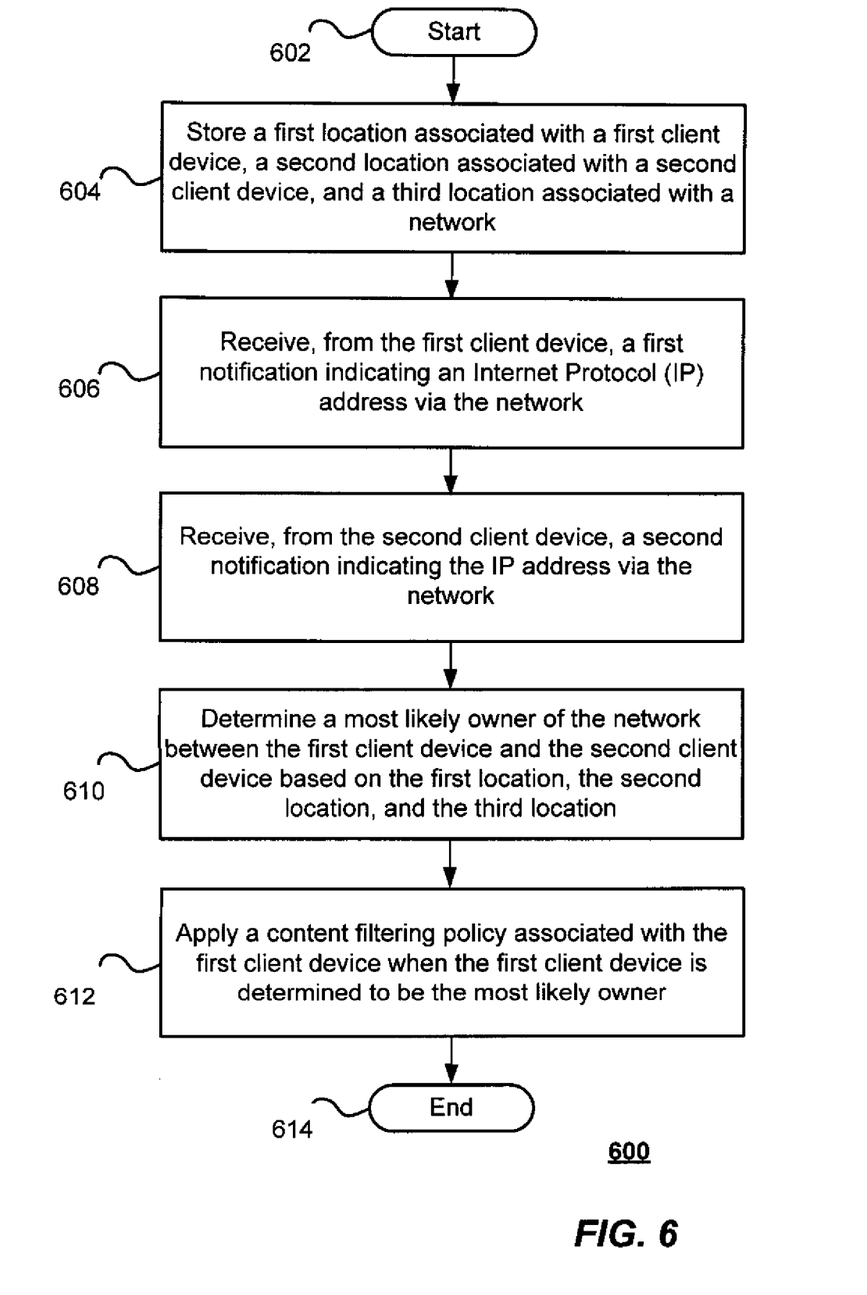
FIG. 6 depicts a method for avoiding dynamic DNS collisions in accordance with an embodiment of the present disclosure.

FIG. 6 depicts a method 600 for avoiding dynamic DNS collisions in accordance with an embodiment of the present disclosure. At block 602, the method 600 may begin.

At block 604, a first location associated with a first client device, a second location associated with a second client device, and a third location associated with a network are stored. The server 140A may store first, second, and third locations as logical locations, physical locations, or a combination of both.

At block 606, a first notification indicating an Internet Protocol (IP) address is received from the first client device via the network. The first client device may be a primary client device and the first notification may indicate the current IP address associated with the primary client device.

At block 608, a second notification indicating the IP address is received from the second client device via the network. The second client device may be a visiting client device and the second notification may indicate the current IP address associated with the primary client device.

At block 610, a most likely owner of the network is determined between the first client device and the second client device based on the first location, the second location, and the third location.

At block 612, a content filtering policy associated with the first client device is applied when the first client device is determined to be the most likely owner.

At block 614, the method 600 may end.

At this point it should be noted that avoiding dynamic DNS collisions in accordance with the present disclosure as described above may involve the processing of input data and the generation of output data to some extent. This input data processing and output data generation may be implemented in hardware or software. For example, specific electronic components may be employed in a priority determination module or similar or related circuitry for implementing the functions associated with avoiding dynamic DNS collisions in accordance with the present disclosure as described above. Alternatively, one or more processors operating in accordance with instructions may implement the functions associated with avoiding dynamic DNS collisions in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for avoiding dynamic domain name system (DNS) collisions comprising:
   storing a first location associated with a primary location of a first client device associated with a first dynamic DNS user, a second location associated with a primary location of a second client device associated with a second dynamic DNS user, and a third location associated with a primary location of a network;
   receiving, from the first client device associated with the first dynamic DNS user, a first notification indicating an Internet Protocol (IP) address assigned to the network, wherein the first client device is connected to the network;
   receiving, from the second client device associated with the second dynamic DNS user, a second notification indicating the IP address assigned to the network, wherein the IP address received from the second client device is the same as the IP address received from the first client device, and wherein the second client device is connected to the network;
   determining a most likely owner of the network between the first client device and the second client device based on the first location, the second location, and the third location, wherein ownership of a network determines which dynamic DNS user the network shall be attributed to; and
   applying a content filtering policy associated with the first client device to at least one attempt to access a network resource via the network when the first client device is determined to be the most likely owner.

2. The method of claim 1, wherein the first client device stores a first dynamic DNS agent.

3. The method of claim 1, wherein the network comprises a private network.

4. The method of claim 1, further comprising determining at least one of the first location, the second location, and the third location using one or more trace routes.

5. The method of claim 1, further comprising determining at least one of the first location, the second location, and the third location using triangulation.

6. The method of claim 1, wherein the first location, the second location, and the third location comprise logical locations.

7. The method of claim 1, wherein the first location, the second location, and the third location comprise physical locations.

8. The method of claim 2, wherein the second client device stores a second dynamic DNS agent, wherein the first dynamic DNS agent and the second dynamic DNS agent are the same type of DNS agent.

9. The method of claim 3, wherein determining a most likely owner of the network further comprises comparing the primary location of the private network to the primary location of the first client device and the primary location of the second client device.

10. The method of claim 1, wherein the second client device is visiting an area associated with the third location.

11. At least one non-transitory processor readable storage medium for storing a computer program of instructions configured to be readable by at least one processor for instructing the at least one processor to execute a computer process for performing the method as recited in claim 1.

12. An article of manufacture for avoiding dynamic domain name system (DNS) collisions, the article of manufacture comprising:
   at least one non-transitory processor readable medium; and
   instructions stored on the at least one medium;
   wherein the instructions are configured to be readable from the at least one medium by at least one processor and thereby cause the at least one processor to operate so as to:
   store a first location associated with a primary location of a first client device associated with a first dynamic DNS user, a second location associated with a primary location of a second client device associated with a second dynamic DNS user, and a third location associated with a primary location of a network;
   receive, from the first client device associated with the first dynamic DNS user, a first notification indicating an Internet Protocol (IP) address assigned to the network, wherein the first client device is connected to the network;
   receive, from the second client device associated with the second dynamic DNS user, a second notification indicating the IP address assigned to the network, wherein the IP address received from the second client device is the same as the IP address received from the first client device, and wherein the second client device is connected to the network;
   determine a most likely owner of the network between the first client device and the second client device based on the first location, the second location, and the third location, wherein ownership of a network determines which dynamic DNS user the network shall be attributed to; and
   apply a content filtering policy associated with the first client device to at least one attempt to access a network resource via the network when the first client device is determined to be the most likely owner.

13. A system for avoiding dynamic domain name system (DNS) collisions comprising:
   one or more hardware processors communicatively coupled to a network, wherein the one or more hardware processors are configured to:
   store a first location associated with a primary location of a first client device associated with a first dynamic DNS user, a second location associated with a primary location of a second client device associated with a second dynamic DNS user, and a third location associated with a primary location of a network;
   receive, from the first client device associated with the first dynamic DNS user, a first notification indicating an Internet Protocol (IP) address assigned to the network, wherein the first client device is connected to the network;
   receive, from the second client device associated with the second dynamic DNS user, a second notification indicating the IP address assigned to the network, wherein the IP address received from the second client device is the same as the IP address received from the first client device, and wherein the second client device is connected to the network;
   determine a most likely owner of the network between the first client device and the second client device based on the first location, the second location, and the third location, wherein ownership of a network determines which dynamic DNS user the network shall be attributed to; and apply a content filtering policy associated with the first client device to at least one attempt to access a network resource via the network when the first client device is determined to be the most likely owner.

14. The system of claim 13, wherein the first client device stores a first dynamic DNS agent, wherein the second client device stores a second dynamic DNS agent, and wherein the first dynamic DNS agent and the second dynamic DNS agent are the same type of DNS agent.

15. The system of claim 13, wherein the network comprises a private network.

16. The system of claim 13, wherein the one or more hardware processors are configured to determine at least one of the first location, the second location, and the third location using one or more trace routes.

17. The system of claim 13, wherein the one or more hardware processors are configured to determine at least one of the first location, the second location, and the third location using triangulation.

18. The system of claim 13, wherein the first location, the second location, and the third location comprise logical locations.

19. The system of claim 13, wherein the first location, the second location, and the third location comprise physical locations.

20. The system of claim 13, wherein the second client device is visiting an area associated with the third location.

* * * * *